United States Patent
Harrison et al.

(10) Patent No.: US 10,802,592 B2
(45) Date of Patent: Oct. 13, 2020

(54) MAGNETIC VIRTUAL SPRINGS FOR HAPTIC SYSTEMS

(71) Applicant: Apple Inc., Cupertino, CA (US)

(72) Inventors: Jere C. Harrison, Mountain View, CA (US); Xin Alice Wu, Santa Clara, CA (US); Sheng Liu, San Jose, CA (US); Yi-Heng Sen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/147,321

(22) Filed: Sep. 28, 2018

(65) Prior Publication Data
US 2020/0103970 A1    Apr. 2, 2020

(51) Int. Cl.
*G06F 3/01* (2006.01)
*G06F 3/046* (2006.01)

(52) U.S. Cl.
CPC .............. *G06F 3/016* (2013.01); *G06F 3/046* (2013.01)

(58) Field of Classification Search
CPC ................... G06F 3/016; G06F 3/046
See application file for complete search history.

(56) References Cited

U.S. PATENT DOCUMENTS

| | | | |
|---|---|---|---|
| 2009/0295552 A1* | 12/2009 | Shahoian | G06F 3/016 340/407.1 |
| 2010/0213773 A1* | 8/2010 | Dong | H02K 33/16 310/25 |
| 2012/0049660 A1* | 3/2012 | Park | B06B 1/045 310/25 |
| 2012/0169151 A1* | 7/2012 | Dong | H02K 33/16 310/25 |

* cited by examiner

*Primary Examiner* — Quan-Zhen Wang
*Assistant Examiner* — Mancil Littlejohn, Jr.
(74) *Attorney, Agent, or Firm* — Fish & Richardson P.C.

(57) ABSTRACT

Disclosed are embodiments of magnetic virtual springs for haptic systems. In an embodiment, a haptic system comprises: a magnetic housing having a surface with a surface profile; a mechanical spring system disposed in the housing, the mechanical spring system including one or more mechanical springs; a mass disposed within the housing and mechanically coupled to the mechanical spring system, the mass including or coupled to a magnet, the surface profile causing a magnetic force component to be generated in at least one direction that varies with the magnet position, the magnetic force component combining with a mechanical force component provided by the mechanical springs.

20 Claims, 10 Drawing Sheets

MAGNETIC DETENT

MAGNETIC DETENT

MAGNETIC VIRTUAL SPRINGS FOR HAPTIC SYSTEMS

TECHNICAL FIELD

This disclosure relates generally to linear resonant actuators.

BACKGROUND

Some mobile devices (e.g., smart phones) include a haptic system that is configured to provide a tactile sensation such as a vibration to a user touching or holding the mobile device. The haptic system is a linear resonant actuator (LRA) that is connected mechanically to an input surface of the mobile device. Drive electronics coupled to the LRA cause the LRA to induce vibration which is transferred to the input surface so that the vibration can be felt by a user who is touching or holding the mobile device.

Haptic modules that use momentum transfer to convey haptic sensation often use a mechanical spring system to provide a well-defined transfer function and to set the idle position of the moving mass. The stiffness of the mechanical springs are typically selected to achieve a desired target resonant frequency. There is a design tradeoff, however, between stiffness and reliability. Stiff mechanical springs allow for high frequency haptic applications but are prone to fatigue failure due to high cyclic stress. Soft or more compliant mechanical springs are more resistant to fatigue failure due to lower cyclic stress but may not be suitable for high frequency haptic applications.

SUMMARY

Disclosed are embodiments of magnetic virtual springs for haptic systems. In an embodiment, a haptic system comprises: a magnetic housing having a surface with a surface profile; a mechanical spring system disposed in the housing, the mechanical spring system including one or more mechanical springs; a mass disposed within the housing and mechanically coupled to the mechanical spring system, the mass including or coupled to a magnet, the surface profile causing a magnetic force component to be generated in at least one direction that varies with the magnet position, the magnetic force component combining with a mechanical force component provided by the mechanical springs.

In an embodiment, an electronic device comprises: a touch surface; a haptic system comprising: a magnetic housing having a surface with a surface profile; a mechanical spring system disposed in the housing, the mechanical spring system including one or more mechanical springs; a mass disposed within the housing and mechanically coupled to the mechanical spring system, the mass including or coupled to a magnet, the surface profile causing a magnetic force component to be generated in at least one direction that varies with the magnet position, the magnetic force component combining with a mechanical force component provided by the mechanical springs; a controller coupled to the haptic system, the controller generating and sending a drive signal to the haptic system to drive the mass into motion, causing a vibration in the touch surface.

Particular embodiments disclosed herein provide one or more of the following advantages. A magnetic virtual spring that supplements a mechanical spring system in one or more directions in a haptic system adds anisotropic stiffness without adding additional stress in the mechanical spring system that would reduce fatigue life. Magnetic virtual linear springs add stiffness or compliance in one direction relative to other directions, allowing higher frequency operation or reduced vibrational coupling. The added stiffness modifies the mode structure of the haptic system to allow higher frequency operation without imposing restrictions on the mechanical spring system design. Magnetic virtual nonlinear springs have an inverse response compared to the Lorentz force of the actuator or the spring mechanical force. This inverse response mitigates vibrational energy transfer into higher order modes of the haptic system, resulting in a stronger, quieter and more reliable haptic system.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

System Overview

Figure 1:
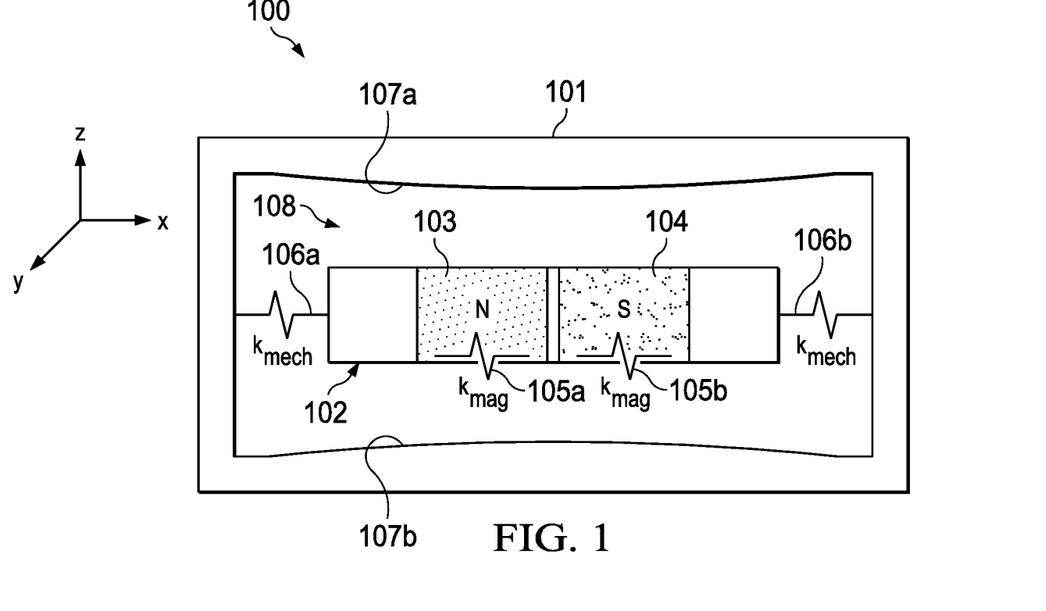
FIG. 1 illustrates a haptic system with mechanical and virtual springs, according to an embodiment.

FIG. 1 is conceptual drawing that illustrates a haptic system with mechanical and virtual springs, according to an embodiment. Haptic system 100 includes magnetic housing 101, mass 102, magnets 103 (North), 104 (South), magnetic virtual springs 105a, 105b with spring constants/stiffness $k_{mag}$ and mechanical springs 106a, 106b with spring constants/stiffness $k_{mech}$.

In the example shown, top surface 107a and bottom surface 107b of magnetic housing 101 have surface profiles that are engineered to generate a magnetic force component ("virtual spring") along the movement axis of mass 102 (x-axis). Depending on the surface profile, the magnetic force component varies linearly or at polynomial order with the position of magnets 103, 104 on the x-axis. Magnetic housing 101 is made of a soft-magnetic material, such that when magnets 103, 104 are close to the soft-magnetic material the magnetic force component is one polynomial order less than an order of the magnet-surface gap function g(x).

In an embodiment, magnetic virtual springs 105a, 105b are coupled in parallel with mechanical springs 106a, 106b and supplement the stiffness of mechanical springs 106a, 106b (collectively, the "mechanical spring system") in each direction (x, y or z) or a combination of directions in a reference coordinate system of haptic system 100. In this embodiment, magnetic virtual springs 105a, 105b add anisotropic stiffness to the mechanical spring system without adding additional cyclic stress to mechanical springs 106a, 106b that can erode the fatigue life of mechanical springs 106a, 106b, as described in reference to FIG. 6.

In another embodiment, mechanical virtual springs 105a, 105b add stiffness or compliance in one direction relative to other directions in haptic system 100 to modify the mode structure of haptic system 101 without imposing restrictions on the mechanical spring system, allowing higher frequency operation or reduced vibrational coupling.

In another embodiment, mechanical virtual springs 105a, 105b have an inverse response compared to the actuator Lorentz force or spring mechanical force, and therefore mitigate vibrational energy transfer into higher order modes of Haptic system 100, resulting in a stronger, quieter and more reliable haptic system.

In an embodiment, a plurality of different surface profiles can be engineered to have different magnetization (B-H) curve characteristics depending on the desired magnetization effect. In an alternative embodiment, only top surface 107a or only the bottom surface 107b have an engineered surface profile but not both top and bottom surfaces 107a, 107b. Although engineered surface profiles are shown in FIG. 1 as top and bottom surfaces, any surface of housing 101 can be engineered to provide a virtual spring force to achieve a desired magnetization effect. Although the profiles engineered in example top and bottom surfaces 107a, 107b are mirror images of each other (i.e., symmetric), engineered surfaces do not have to have identical or similar profiles.

Surface profiles can be engineered using a combination of materials to provide constant, linear and non-linear (e.g., quadratic, cubic, quartic, quantic) forces in any direction. The forces can be used in a variety of haptic applications, including but not limited to: 1) providing a restoring force to a mass reference position that is independent of mechanical components that exceed yield strength after experience shocks; 2) increase the stiffness and resonant frequency of the haptic system without increasing the cyclic stress on the mechanical spring system; 3) compensate for nonlinearity in the haptic system design; 4) introduce bi-stability into the haptic system; 5) decrease operating spring stiffness while maintaining high spring stiffness during assembly of the haptic system; 6) decrease operating spring stiffness in one direction (e.g., x-axis) relative to other directions of haptic system 100 (e.g., y-axis, z-axis) to increase mode separation between operating bandwidth and higher order modes; 7) provide magnetic return force for unidirectional magnetic actuators (permanent magnet-free actuators); 8) provide nonlinear magnetic return force to compensate for nonlinear unidirectional magnetic actuator (gap closing permanent magnet-free actuator); 9) provide separate and discrete regions of no magnetic force and regions of magnetic return force, such as when nearing an end of available actuator travel; and 10) superimposing force to hold an inner assembly centered and away from the housing edges.

For cylindrical actuators with angle-oriented virtual springs (See FIG. 3D), a surface profile provides a return to start (like a rotary phone) or a rotary detent sensation without using nonlinear mechanical elements.

Figure 2A:
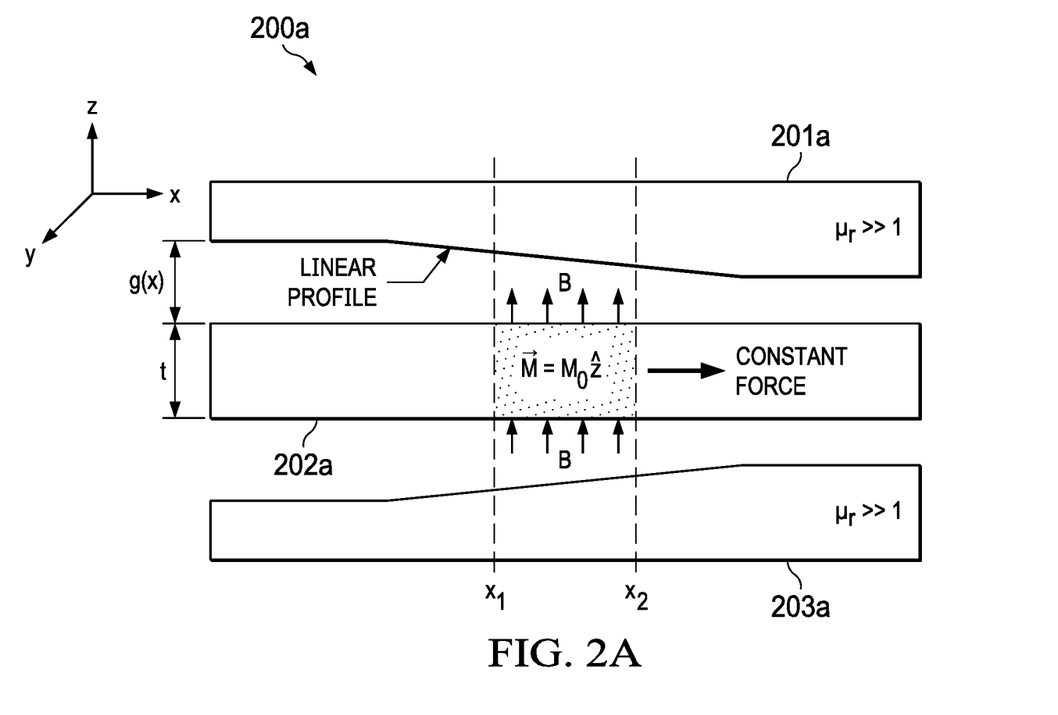
FIG. 2A illustrates a linear virtual spring model, according to an embodiment.

FIG. 2A illustrates a linear virtual spring model, according to an embodiment. In practice, 3-dimensional (3D) field fringing causes the magnetic flux density |B(x,z)| to vary over the region of the magnetic gap profile g(x). The fringing field has the effect of linearizing the magnetic force of the virtual spring. Nonlinear higher order magnetic gap profiles produce stiffer linear virtual springs with small nonlinear components. The degree to which the force is linearized depends on how small the gap is relative to the size of the magnets.

Assuming that the surface-magnet gap g(x)<<t (mass thickness) for x, such that the magnetic flux density |B(x,z)| does not vary significantly in the region <$x_1$, $x_2$>, the energy density dE per unit volume in the haptic system due to magnetic field B can be calculated from Equation [1]:

$$dE = \tfrac{1}{2} B^2 / \mu dV, \quad [1]$$

where μ is the permeability.

The force on a magnet in the haptic system due to the magnetic profile can be calculated from the spatial gradient of energy described by Equation [2]:

$$\overline{F} = -\nabla E, \quad [2]$$

where ∇ is the gradient operator.

For a linearly varying gap function, $g(x) = -\alpha x + g_o$, a constant magnetic force component F toward the smaller gap will be present, which is analogous to a constant force spring (no displacement dependency), as shown in Equation [3]:

$$F = \left( \frac{1}{2} \frac{B^2}{\mu A_{magnet}} \right)(\alpha)\hat{x}, \quad [3]$$

where B is the magnetic field (e.g., 0.5 Tesla), $A_{magnet}$ is the area of the magnet (e.g., 25 mm²) and α is the slope (e.g., 1 mm/10 mm) of the gap in the region <$x_1$, $x_2$>. The magnetic force component F provides the virtual linear spring with spring constant $k_{mag}(x)$ (e.g., 1 N), as shown in FIG. 1.

Figure 2B:
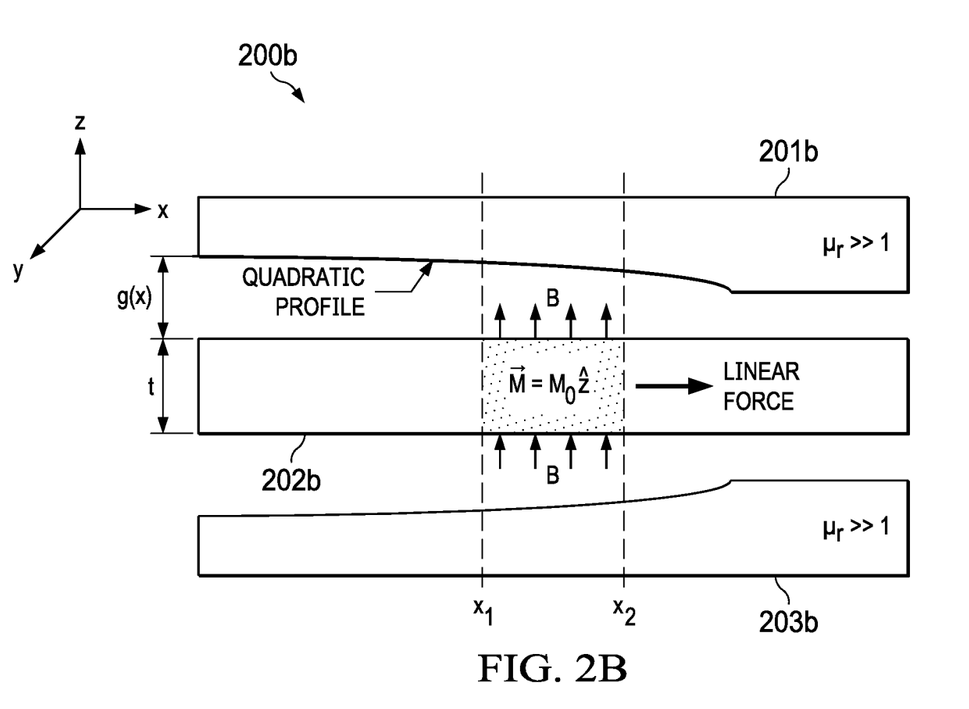
FIG. 2B illustrates a quadratic virtual spring model, according to an embodiment.

FIG. 2B illustrates a quadratic virtual spring model, according to an embodiment. For a quadratic varying gap, $g(x) = -\alpha x^2 + g_o$, Equation [4] is the linear restoring force toward the smaller gap, which is analogous to a pre-tensioned linear spring:

$$F = \left( \frac{B^2}{\mu} A_{magnet} \right)(\alpha x)\hat{x}. \quad [4]$$

For a cubic varying gap, $g(x)=-\alpha x^3+g_o$, Equation [5] is a nonlinear quadratic force toward the smaller gap, which is analogous to a pre-tensioned nonlinear spring:

$$F = \left(\frac{3}{2}\frac{B^2}{\mu}A_{magnet}\right)(\alpha x^2)\hat{x}. \quad [5]$$

For a quintic varying gap, $g(x)=-\alpha x^4+g_o$, Equation [6] is the linear restoring force toward the smaller gap, which is analogous to a pre-tensioned linear spring:

$$F = \left(\frac{2B^2}{\mu}A_{magnet}\right)(\alpha x^3)\hat{x}. \quad [6]$$

For a quantic varying gap, $g(x)=-\alpha x^5+g_o$, Equation [7] is a nonlinear quartic force toward the smaller gap, which is analogous to a pre-tensioned nonlinear spring:

$$F = \left(\frac{5}{2}\frac{B^2}{\mu}A_{magnet}\right)(\alpha x^4)\hat{x}. \quad [7]$$

Arbitrary forms of actuator nonlinearity can be counteracted by approximating the nonlinear force with a Taylor series expansion and constructing a nonlinear magnetic virtual spring using a superposition of the above methods.

Figure 3A:
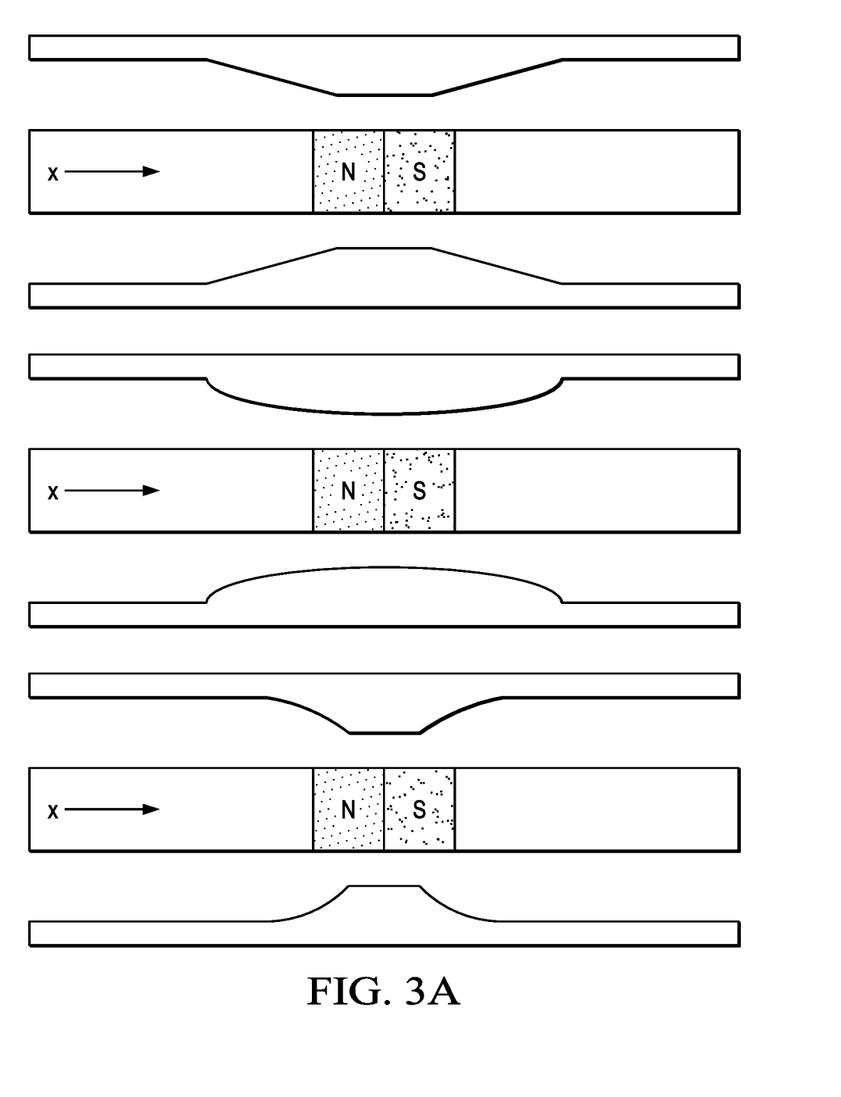
FIG. 3A illustrates three x-orientated virtual spring models for providing constant, linear and non-linear forces with pre-tension at the center of the haptic module, according to an embodiment.

FIG. 3A illustrates three x-oriented virtual spring models for providing constant, linear and non-linear forces with pre-tension at the center of the haptic system, according to an embodiment.

The top figure is a side view of a haptic system having a surface profile for generating a constant magnetic force along the x-axis that restores to the haptic system center that is independent of mechanical components that exceed yield strength after shocks.

The middle figure is a side view of a haptic system having a surface profile that generates a linear magnetic force along the x-axis by increasing the operating stiffness $K_x$ and resonant frequency without increasing cyclic stress on the mechanical springs.

The bottom figure is a side view of a haptic system having a surface profile that generates a non-linear magnetic force along the x-axis to compensate for nonlinearity in the actuator's mechanical design.

Figure 3B:
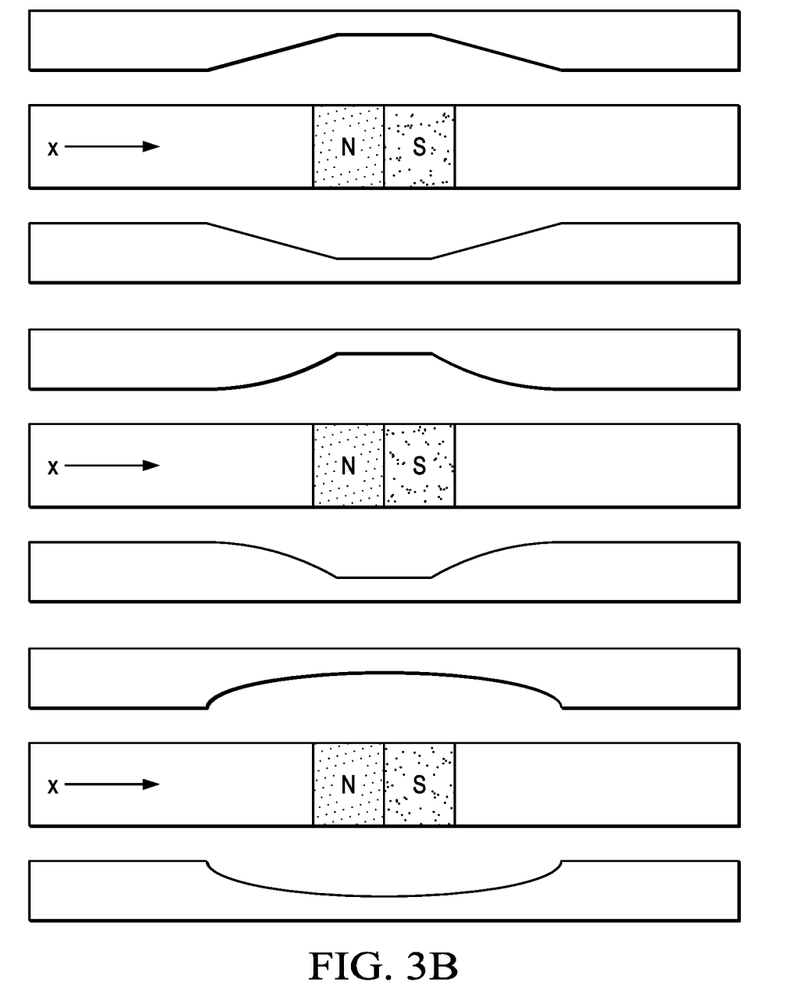
FIG. 3B illustrates three x-oriented virtual spring models for providing constant, linear and non-linear forces with pre-compression at the center of the haptic module, according to an embodiment.

FIG. 3B illustrates three x-oriented virtual spring models for providing constant, linear and non-linear forces with pre-compression at the center of the haptic module, according to an embodiment.

The top figure is a side view of a haptic system having a surface profile for generating a constant magnetic force along the x-axis that introduces bi-stability into the structure of the haptic system, which is useful for increasing the bandwidth of magnetic energy transducers.

The middle figure is a side view of a haptic system having a surface profile that generates a linear magnetic force along the x-axis by decreasing the operating stiffness $K_x$ while still having high spring stiffness during assembly or decreasing the operating stiffness $K_x$ relative to stiffness $K_y$ in the y-axis and $K_z$ in the z-axis to increase mode separation between the operating bandwidth and higher order modes.

The bottom figure is a side view of a haptic system having a surface profile that generates a non-linear magnetic force along the x-axis to compensate for nonlinearity in the actuator's mechanical design, and to counteract nonlinear operating stiffness $K_x$ for flexure systems that undergo axial loads in addition to bending loads during operation.

Figure 3C:
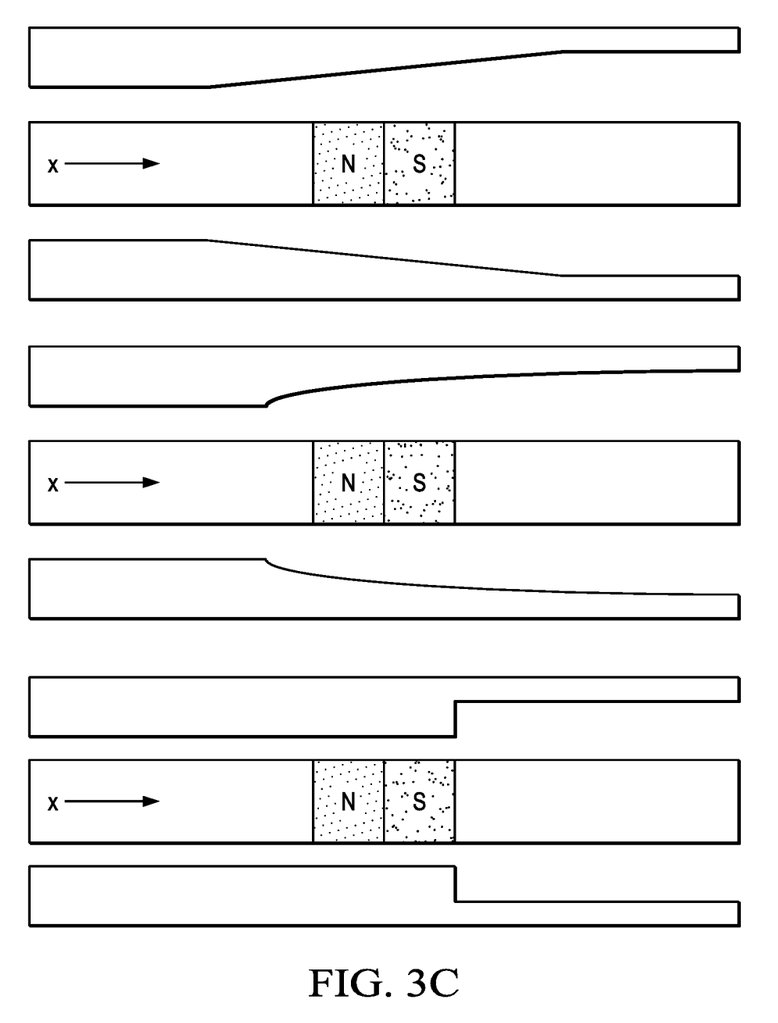
FIG. 3C illustrates three x-orientated virtual spring models for providing constant, linear and non-linear forces with pre-tension in the x-direction (movement axis) of the haptic module, according to an embodiment.

FIG. 3C illustrates three x-oriented virtual spring models for providing constant, linear and non-linear forces with pre-tension in the x-direction (movement axis) of the haptic module, according to an embodiment.

The top figure is a side view of a haptic system having a surface profile for generating a constant magnetic return force along the x-axis for unidirectional magnetic actuators (e.g., permanent magnet-free actuators).

The middle figure is a side view of a haptic system having a surface profile that generates a linear magnetic return force along the x-axis for unidirectional magnetic actuators.

The bottom figure is a side view of a haptic system having a surface profile that generates a non-linear magnetic return force along the x-axis to compensate for a nonlinear unidirectional magnetic actuator (e.g., gap closing permanent magnet-free actuator), or provides separate and discrete regions of no magnetic return force and regions of magnetic return force, such as when nearing an end of available actuator travel.

The x-oriented virtual spring models described above can be similarly derived for y-orientated and z-oriented virtual spring models to achieve desired magnetization effects.

Figure 3D:
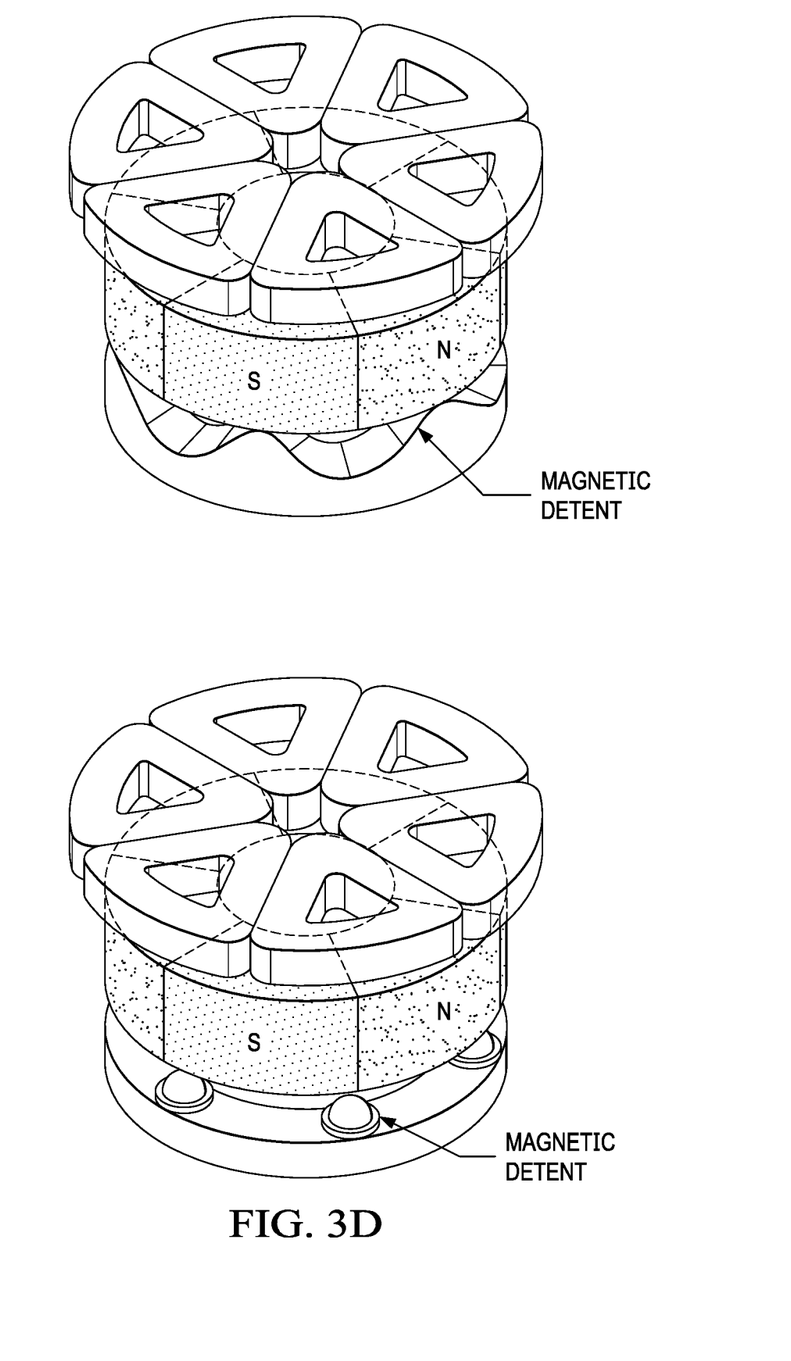
FIG. 3D illustrates two angle-orientated virtual spring models for providing linear and non-linear forces for pre-tension to periodic location, according to an embodiment.

FIG. 3D illustrates two angle-oriented virtual spring models for providing linear and non-linear forces for pre-tension to periodic location, according to an embodiment.

The top figure is a perspective view of a cylindrical haptic system having a bottom plate surface profile for generating a linear force to provide a rotary detent sensation without using nonlinear mechanical elements.

The bottom figure is a perspective view of a cylindrical haptic system that has a bottom plate having a surface profile that generates a nonlinear force to provide a rotary detent sensation without using nonlinear mechanical elements.

Example Manufacturing Process

Figure 4A:
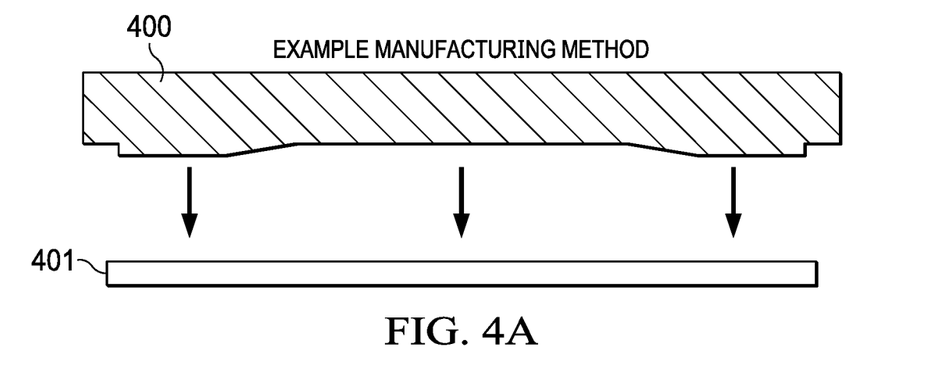
FIG. 4A is a side view of a stamping tool die used to coin a virtual spring surface profile into magnetic material, according to an embodiment.
Figure 4B:
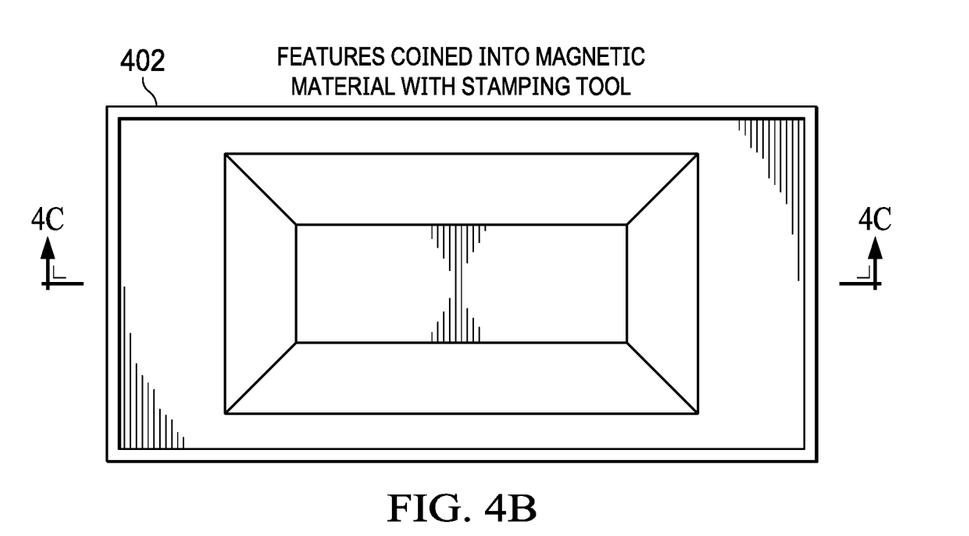
FIG. 4B is a top view of the magnetic material with the surface profile coined therein.
Figure 4C:
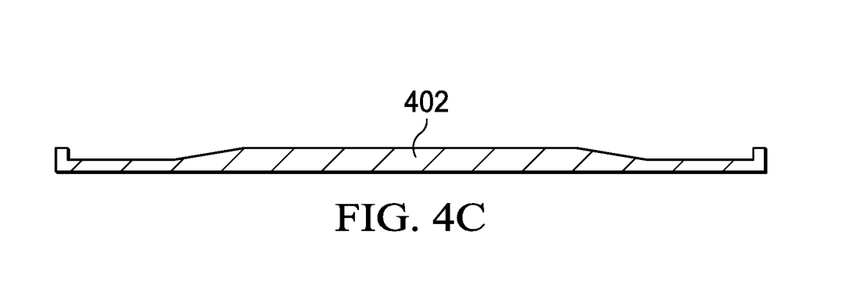
FIG. 4C is a cross-section of the magnetic material along line A-A' showing the surface profile coined therein.

FIG. 4A is a side view of stamping tool die 400 used to coin a virtual spring surface profile into magnetic material 401 (e.g., SuS430), according to an embodiment. FIG. 4B is a top view of magnetic material 401 with the surface profile coined therein. FIG. 4C is a cross-section along line A-A' of magnetic material 401 showing the surface profile coined therein. Other example manufacturing processes for virtual springs include but are not limited to: computer numerical control machining (CNC) by laser or mechanical removal, casting, forging, rolling (e.g., as profile bar), metal injection molding (MIM), press and sintering (P&S) and additive manufacturing, such as ultra-additive manufacturing (UAM) that uses sound to merge layers of metal drawn from featureless foil stock.

Figure 5A:
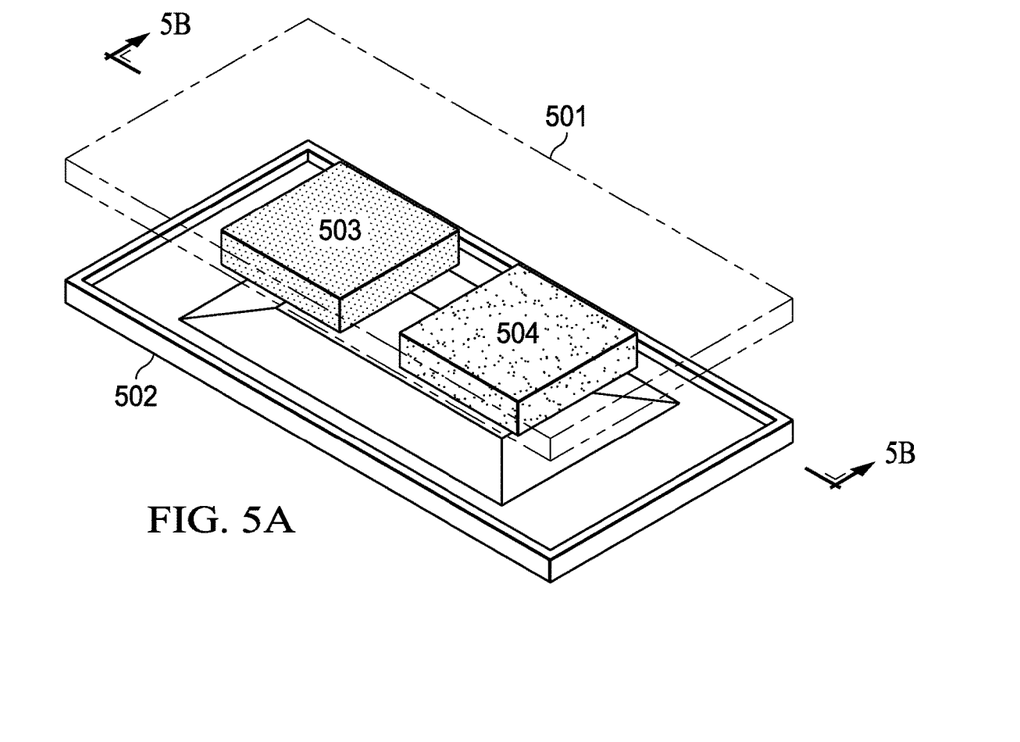
FIG. 5A is a perspective view of a haptic system that illustrates implementation of virtual springs providing a return force to center, according to an embodiment.
Figure 5B:
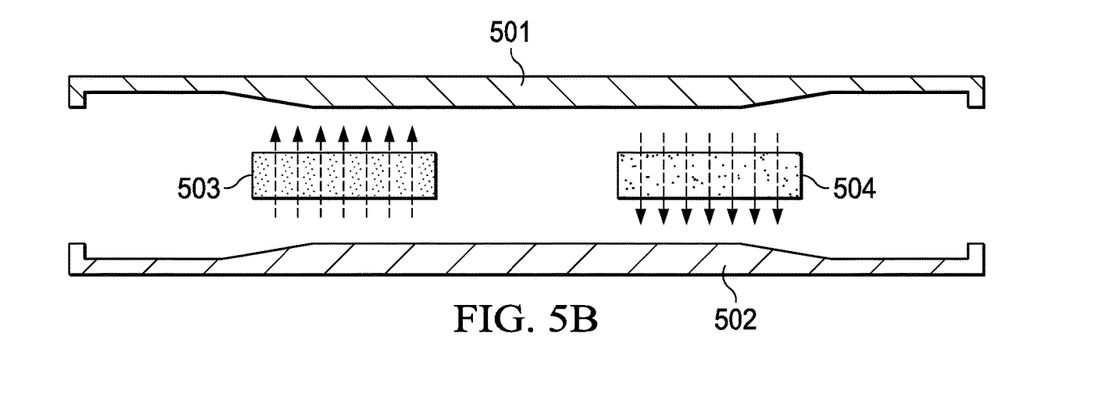
FIG. 5B is a cross-section along line B-B' of the haptic system of FIG. 5A, according to an embodiment.

FIG. 5A is a perspective view of a haptic system that illustrates virtual springs that provide a return force to the center of the haptic system (e.g., the mass reference position), according to an embodiment. Top surface 501 and bottom surface 502 of the haptic system housing each have a surface profile coined therein for creating virtual springs when North and South magnets 503, 504 are close to the surface profiles. FIG. 5B is a cross-section along line B-B' shown in FIG. 5A. FIG. 5B shows the surface profiles and the direction of magnetic fields generated by North and South magnets 503, 504, according to an embodiment.

Figure 6:
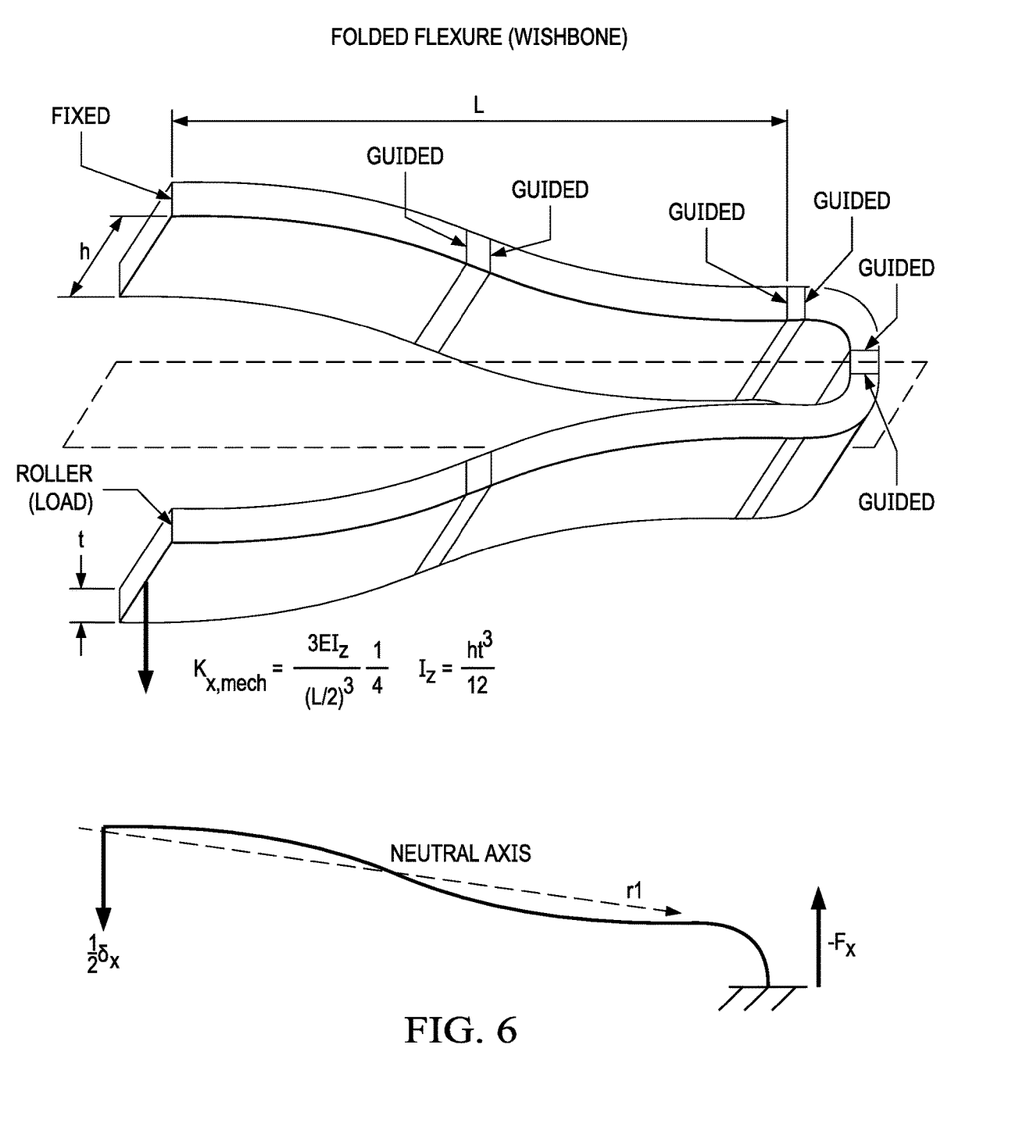
FIG. 6 is a perspective view of a mechanical spring system (folded "wishbone" flexure) for illustrating cyclic stress, according to an embodiment.

FIG. 6 is a perspective view of a mechanical spring system (folded "wishbone" flexure) for illustrating the reduction of cyclic stress due to the use of virtual springs, according to an embodiment. In this example, we assume the following haptic system specifications:

resonant frequency $f_0$=80 Hz
moving mass m=8 g
actuator travel $x_0$=1 mm
required spring stiffness $K_{x,mech}$=2 N/mm.

Assuming a pair of mechanical springs that are folded "wishbone" flexures made of 0.1 mm thick (t), 1 mm wide (h) steel strip connected to the mass in parallel, the length L of each flexure would be L=4.65 mm. Peak stress in the flexure cross section $\sigma_{max}$ is the bending moment M times the thickness t divided by the cross-sectional moment of inertia $I_z$ $$\left(\sigma_{max} \approx -\frac{Mt}{2I_z}\right)$$

and in this example would be 1.395 GPa for each 1 N/mm spring at full displacement.

Including a 0.5 N/mm total magnetic virtual spring, the required spring constant $K_{x,mech}$ for each flexure can be reduced to 0.75 N/mm. If the length L is increased to 5.10 mmm to achieve this new 0.75 N/mm spring constant, the average stress across the flexure is reduced to 1.148 GPa, which is a 22% reduction in cyclic stress.

Example Device Architecture

Figure 7:
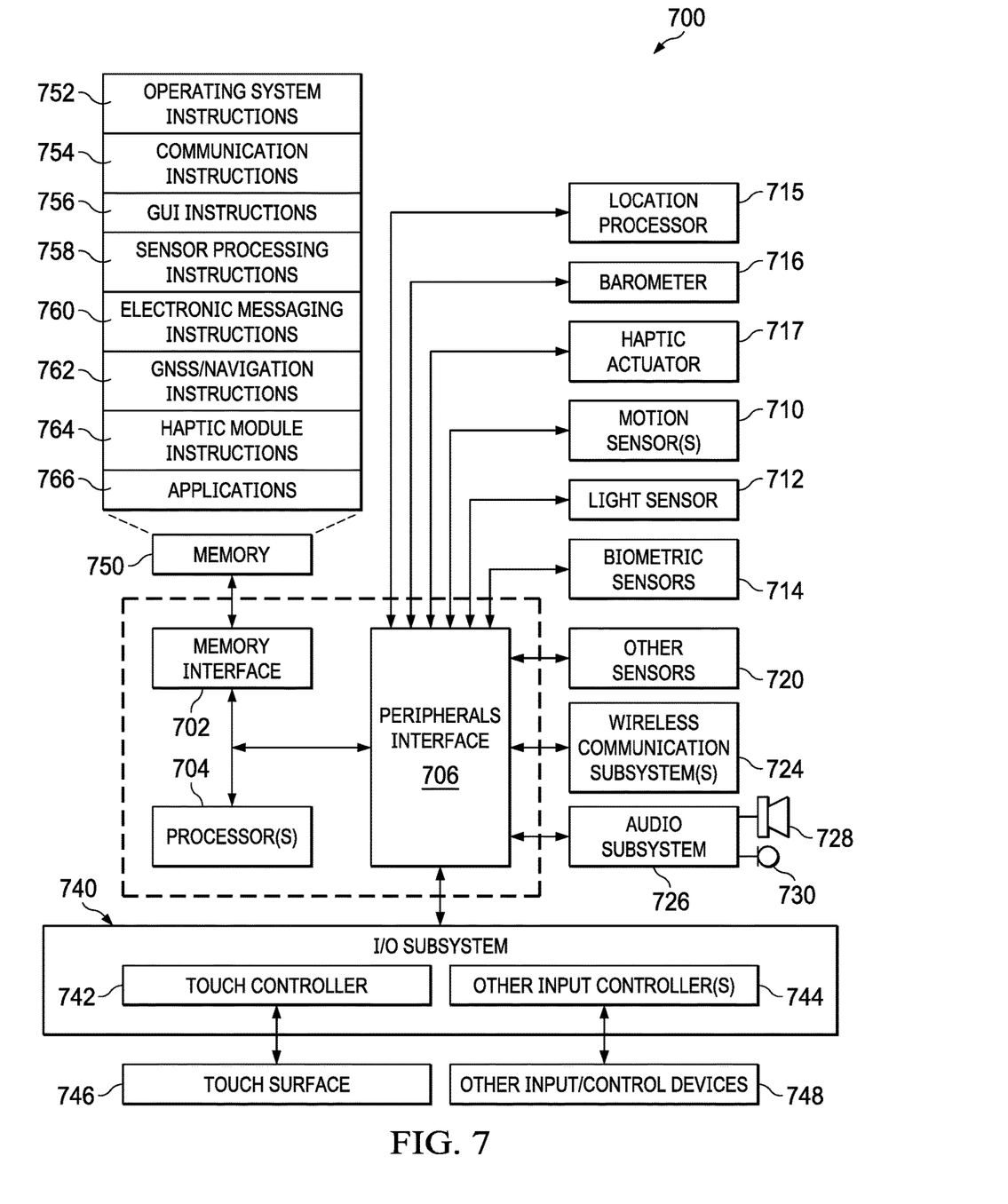
FIG. 7 is a diagram of an example mobile device architecture that uses a haptic system as described in reference to FIGS. 1-6, according to an embodiment.

FIG. 7 is a diagram of an example mobile device architecture that uses one of the haptic modules described in reference to FIGS. 1-6, according to an embodiment.

Architecture 700 may be implemented in any mobile device for generating the features and processes described in reference to FIGS. 1-6, including but not limited to smart phones and wearable computers (e.g., smart watches, fitness bands). Architecture 700 may include memory interface 702, data processor(s), image processor(s) or central processing unit(s) 704, and peripherals interface 706. Memory interface 702, processor(s) 704 or peripherals interface 706 may be separate components or may be integrated in one or more integrated circuits. One or more communication buses or signal lines may couple the various components.

Sensors, devices, and subsystems may be coupled to peripherals interface 706 to facilitate multiple functionalities. For example, motion sensor(s) 710, light sensor 712, and proximity sensor 714 may be coupled to peripherals interface 706 to facilitate orientation, lighting, and proximity functions of the device. For example, in some embodiments, light sensor 712 may be utilized to facilitate adjusting the brightness of touch surface 746. In some embodiments, motion sensor(s) 710 (e.g., an accelerometer, rate gyroscope) may be utilized to detect movement and orientation of the device. Accordingly, display objects or media may be presented according to a detected orientation (e.g., portrait or landscape).

Haptic module 717, under the control of haptic module instructions 772, provides the features and performs the processes described in reference to FIGS. 1-6, such as, for example, implementing haptic feedback (e.g., vibration). Haptic module 717 can include one or more actuators, such as piezoelectric transducers, electromechanical devices, and/ or other vibration inducing devices that are mechanically connected to an input surface (e.g., touch surface 746). Drive electronics coupled to the one or more actuators cause the actuators to induce a vibratory response into the input surface, providing a tactile sensation to a user touching or holding the device.

Other sensors may also be connected to peripherals interface 706, such as a temperature sensor, a barometer, a biometric sensor, or other sensing device, to facilitate related functionalities. For example, a biometric sensor can detect fingerprints and monitor heart rate and other fitness parameters.

Location processor 715 (e.g., GNSS receiver chip) may be connected to peripherals interface 706 to provide geo-referencing. Electronic magnetometer 716 (e.g., an integrated circuit chip) may also be connected to peripherals interface 706 to provide data that may be used to determine the direction of magnetic North. Thus, electronic magnetometer 716 may be used to support an electronic compass application.

Camera subsystem 720 and an optical sensor 722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 724. Communication subsystem(s) 724 may include one or more wireless communication subsystems. Wireless communication subsystems 724 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 724 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 726 may be coupled to a speaker 728 and one or more microphones 730 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 740 may include touch controller 742 and/or other input controller(s) 744. Touch controller 742 may be coupled to a touch surface 746. Touch surface 746 and touch controller 742 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 745. In one embodiment, touch surface 746 may display virtual or soft buttons and a virtual keyboard, which may be used as an input/output device by the user.

Other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of speaker 728 and/or microphone 730.

In some embodiments, device 700 may present recorded audio and/or video files, such as MP3, AAC, and MPEG video files. In some embodiments, device 700 may include the functionality of an MP3 player and may include a pin connector for tethering to other devices. Other input/output and control devices may be used.

Memory interface 702 may be coupled to memory 750. Memory 750 may include high-speed random access memory or non-volatile memory, such as one or more magnetic disk storage devices, one or more optical storage devices, or flash memory (e.g., NAND, NOR). Memory 750 may store operating system 752, such as Darwin, RTXC, LINUX, UNIX, OS X, iOS, WINDOWS, or an embedded operating system such as VxWorks. Operating system 752 may include instructions for handling basic system services and for performing hardware dependent tasks. In some embodiments, operating system 752 may include a kernel (e.g., UNIX kernel).

Memory 750 may also store communication instructions 754 to facilitate communicating with one or more additional devices, one or more computers or servers, including peer-to-peer communications. Communication instructions 754 may also be used to select an operational mode or communication medium for use by the device, based on a geographic location (obtained by the GPS/Navigation instructions 768) of the device.

Memory 750 may include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS (e.g., GPS, GLOSSNAS) and navigation-related processes and functions; camera instructions 770 to facilitate camera-related processes and functions; and haptic module instructions 772 for commanding or controlling haptic module 717 and to provide the features and performing the processes described in reference to FIGS. 1-6.

Each of the above identified instructions and applications may correspond to a set of instructions for performing one or more functions described above. These instructions need not be implemented as separate software programs, procedures, or modules. Memory 750 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C # and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic system comprising:
a magnetic housing having a surface that varies according to a linear or non-linear surface profile;
a mechanical spring system disposed in the housing, the mechanical spring system including one or more mechanical springs; and
a mass disposed within the housing and mechanically coupled to the mechanical spring system, the mass including or coupled to a magnet,
the surface profile causing a magnetic force component to be generated in at least one direction that varies with the magnet position, the magnetic force component combining with a mechanical force component provided by the mechanical springs.

2. The haptic system of claim 1, wherein the surface profile is described by a quadratic function.

3. The haptic system of claim 1, wherein the magnetic force component is constant.

4. The haptic system of claim 1, wherein the magnetic force component restores the mass to a reference position.

5. The haptic system of claim 1, wherein the magnetic force component compensates for non-linearity in the mechanical springs.

6. The haptic system of claim 1, wherein the magnetic force component provides resting bi-stability when the mass is resting.

7. The haptic system of claim 1, wherein the profile features are coined into the surface of the magnetic housing.

8. The haptic system of claim 1, wherein the magnetic housing is cylindrical and the magnetic force component provides a restoring force to an angular position of the mass.

9. The haptic system of claim 1, wherein the magnetic force mitigates vibration energy transfer into higher order modes of the haptic system.

10. The haptic system of claim 1, wherein the magnetic force provides pre-tension or per-compression at a center of the haptic system.

11. The haptic system of claim 1, wherein the magnetic housing has a top surface above the mass and a bottom surface below the mass, and the top surface varies according to a first linear of non-linear surface profile, and the bottom surface varies according to a second linear or non-linear surface profile.

12. An electronic device, comprising:
a touch surface;
a haptic system comprising:
  a magnetic housing having a surface that varies according to a linear or non-linear surface profile;
  a mechanical spring system disposed in the housing, the mechanical spring system including one or more mechanical springs;
  a mass disposed within the housing and mechanically coupled to the mechanical spring system, the mass including or coupled to a magnet,
  the surface profile causing a magnetic force component to be generated in at least one direction that varies with the magnet position, the magnetic force component combining with a mechanical force component provided by the mechanical springs; and
a controller coupled to the haptic system, the controller configured to generate and send a drive signal to the haptic system to drive the mass into motion, and to adjust the drive signal based on one or more feedback signals from the haptic system that are generated in response to the motion, causing a vibration in the touch surface.

13. The electronic device of claim 12, wherein the surface profile is described by a quadratic function.

14. The electronic device of claim 12, wherein the magnetic force component is constant.

15. The electronic device of claim 12, wherein the magnetic force component restores the mass to a reference position.

16. The electronic device of claim 12, wherein the magnetic force component compensates for non-linearity in the mechanical springs.

17. The electronic device of claim 12, wherein the magnetic force component provides resting bistability when the mass is resting.

18. The electronic device of claim 12, wherein the profile features are coined into the surface of the magnetic housing.

19. The electronic device of claim 12, wherein the magnetic housing is cylindrical and the magnetic force component provides a restoring force to an angular position of the mass.

20. The haptic system of claim 8, wherein the magnetic force provides a rotary detent sensation.

* * * * *

UNITED STATES PATENT AND TRADEMARK OFFICE
CERTIFICATE OF CORRECTION

PATENT NO. : 10,802,592 B2  
APPLICATION NO. : 16/147321  
DATED : October 13, 2020  
INVENTOR(S) : Jere C. Harrison et al.

It is certified that error appears in the above-identified patent and that said Letters Patent is hereby corrected as shown below:

In the Claims

Column 10, Line 66, in Claim 10, delete "per-compression" and insert -- pre-compression --; and Column 11, Line 4, in Claim 11, delete "of" and insert -- or --.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*